(12) United States Patent
Yano et al.

(10) Patent No.: US 6,711,594 B2
(45) Date of Patent: Mar. 23, 2004

(54) DISTRIBUTED DATA ARCHIVE DEVICE AND SYSTEM

(75) Inventors: Yoshihiro Yano, Tokyo (JP); Naoyuki Oshima, Tokyo (JP); Fukio Handa, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 263 days.

(21) Appl. No.: 09/913,305

(22) PCT Filed: Dec. 19, 2000

(86) PCT No.: PCT/JP00/08986

§ 371 (c)(1),
(2), (4) Date: Aug. 13, 2001

(87) PCT Pub. No.: WO01/46808

PCT Pub. Date: Jun. 28, 2001

(65) Prior Publication Data

US 2002/0138504 A1 Sep. 26, 2002

(30) Foreign Application Priority Data

Dec. 20, 1999 (JP) .......................... 11-360276

(51) Int. Cl.[7] .................................. G06F 17/30
(52) U.S. Cl. ............................ 707/204; 707/10
(58) Field of Search .................. 707/1, 10, 100, 707/202, 205, 204; 360/69; 709/102, 219; 711/6, 111, 161, 162

(56) References Cited

U.S. PATENT DOCUMENTS

| | | | | |
|---|---|---|---|---|
| 4,960,982 A | | 10/1990 | Takahira | 235/382 |
| 5,191,611 A | | 3/1993 | Lang | 380/25 |
| 5,832,523 A | * | 11/1998 | Kanai et al. | 707/204 |
| 5,956,733 A | * | 9/1999 | Nakano et al. | 707/204 |
| 6,185,655 B1 | * | 2/2001 | Peping | 711/6 |
| 6,378,054 B1 | * | 4/2002 | Karasudani et al. | 711/161 |
| 6,591,287 B1 | * | 7/2003 | More et al. | 709/102 |

FOREIGN PATENT DOCUMENTS

| | | |
|---|---|---|
| EP | 0856818 | 8/1998 |
| EP | 1193666 | 4/2002 |
| JP | 3108830 | 5/1991 |
| JP | 6236324 | 8/1994 |
| JP | 11134259 | 5/1999 |
| JP | 200059355 | 2/2000 |
| JP | 00172548 | 6/2000 |
| JP | 00305849 | 11/2000 |
| JP | 2001142396 | 5/2001 |
| WO | 0026866 | 5/2000 |

OTHER PUBLICATIONS

Patent Abstracts of Japan of 11 134259 dated May 21, 1999.

* cited by examiner

*Primary Examiner*—Diane D. Mizrahi
*Assistant Examiner*—Apu M Mofiz
(74) *Attorney, Agent, or Firm*—Ladas & Parry (57) ABSTRACT

A distributed data archive device (1) is placed on an arbitrary location on a network (3) so that data can be saved and extracted. During data saving, a to-be-saved data file (F1) is given to the archive device (1), and a division/encryption means (13) carries out division/encryption, and individual divided files are distributed and saved onto data servers (2a, 2b, 2c) by a network communication means (16). A data management means (15) forms management data that shows a division/encryption method and a depository-destination data server, and records it onto a portable recording medium (10) during the data saving. During data extraction, the portable recording medium (10) is connected to an arbitrary archive device (1), and the management data is read. Based on this management data, the divided files are extracted from the depository destinations, and are reconstituted into the original data file (F1) by a decryption/integration means (14).

20 Claims, 4 Drawing Sheets

DATA DEPOSITORY INFORMATION

| DIVIDED FILE | DEPOSITORY DESTINATION | ALTERNATIVE DESTINATION |
|---|---|---|
| F 1 1 | U R L (2 a) | U R L (2 d) |
| F 1 2 | U R L (2 b) | U R L (2 d) |
| F 1 3 | U R L (2 c) | U R L (2 e) |

DISTRIBUTED DATA ARCHIVE DEVICE AND SYSTEM

TECHNICAL FIELD

The present invention relates to a data archive device and a data archive system capable of saving digital data in a predetermined location by the use of a network and extracting it when necessary. More specifically, the present invention relates to a data archive system capable of distributing a copy of valuable digital data to a plurality of locations on a network and retaining it for backup purposes.

BACKGROUND ART

It has been widely carried out to transmit a backup of data created by, for example, a computer from the computer to other file servers, or the like, connected through a network so as to save the valuable data. If this network is extended to a global wide area network like the Internet, it will be possible to save the data from any place in the world and extract the saved data from any place in the world as long as there is an environment accessible to the Internet. However, although the convenience of users improves proportionately with the enlargement of the scale of a network to be used, security will decrease inversely. To-be-saved data usually includes private information about individuals, and therefore satisfactory security must be ensured so that only the person in question who has deposited the data or only the agent who has been entrusted by the person with the matter can extract the data. Accordingly, the conventional data archive system utilizing a network has a problem in that security decreases in inverse proportion to the improvement of the convenience of depositing data and extracting it from any place.

The present invention has been made in consideration of this problem. It is therefore an object of the present invention to provide a data archive system that allows only a person who has deposited data or only a specific person who has been permitted to access data to safely access the deposited data from an arbitrary location and that does not require the server side saving the data to prepare special devices and software.

DISCLOSURE OF THE INVENTION

In order to solve the above problem, the present invention prepares a distributed data archive device that comprises a verification means for checking the authenticity of a user, a division means for dividing data to be saved into a plurality of parts, an integration/reconstitution means for reconstituting divided/saved data into an original single data file, a network communication means for transferring the data files divided by a communication protocol determined among data servers keeping the data to be saved, and a data management means for recording data depository information that indicates a depository of the data to be saved and data-saving procedure information that indicates a dividing method of the data to be saved and the like when data-saving is newly carried out, wherein the data to be saved is divided into a plurality of parts when the data is saved, and the divided parts are each transferred to a plurality of servers on a network and are distributed/saved therein, and, when the data to be saved is extracted, the data to be saved that has been distributed into the plurality of servers on the network and has been saved therein is extracted in accordance with the data depository information and the data-saving procedure information that have been recorded when saved, and the divided parts are integrated and reconstituted into the original file, and it is provided to a user. It is difficult to steal valuable data when the data is divided and saved in a plurality of servers.

Further, in order to solve the above problem, the present invention prepares a distributed data archive device that comprises a reading/writing means for reading/writing digital data from/onto a portable recording medium, a verification means for checking the authenticity of a user, a division means for dividing data to be saved into a plurality of parts, an integration/reconstitution means for reconstituting divided/saved data into an original single data file, a network communication means for transferring the data files divided by a communication protocol determined among data servers keeping the data to be saved, and a data management means for recording data-depository information that indicates a depository of the data to be saved and data-saving procedure information that indicates a dividing method of the data to be saved and the like onto the portable recording medium when data-saving is newly carried out. The present invention forms a distributed data archive system that is made up of this distributed data archive device, the portable recording medium, a network, and a plurality of data servers, wherein, when the data is saved, the data to be saved is divided into a plurality of parts in accordance with the data-depository information and the data-saving procedure information that have been recorded on the portable recording medium, and the divided parts are each transferred to the plurality of servers on the network and are distributed/saved therein. Whereas, when the data to be saved is extracted, the data to be saved that has been distributed into the plurality of servers on the network and has been saved therein is extracted in accordance with the data-depository information and the data-saving procedure information that have been recorded on the portable recording medium, and the divided parts are integrated and reconstituted into the original file, and it is provided to a user. According to this system, it becomes possible to access the saved data from an arbitrary distributed data archive device connected to the network as long as the portable recording medium is carried with the user. For example, if the user is carrying a recording medium, such as a floppy disk, that records data-depository information and data-saving procedure information, the user can extract desired archive data from any location by logging in an arbitrary distributed data archive device connected to the network.

Further, a pronounced effect will be produced if a means for encrypting data is added, and a plurality of divided data to be saved are formed in such a way as to perform the encryption after the to-be-saved data is divided by the division means or, alternatively, to perform the division after the to-be-saved data is encrypted, and cryptographic key information and the like that are needed for encryption/decryption are recorded as the data-saving procedure information by the data management means, and, according to the recorded data-saving procedure information, the integration/reconstitution means reconstitutes the divided data into the original data in such a way as to perform the integration after the saved individual divided data are decrypted or, alternatively, to perform the decryption after the divided data are integrated. The encryption of the individual divided data makes it difficult to know the original data, and therefore there is substantially no fear that a furtive glance will be cast at the data even though the data is retained on an open network like the Internet.

Further, if, when the data is saved, dummy data is added according to a given rule at any step when the to-be-saved data is divided or is encrypted after the division or is divided after the encryption, and the dummy data addition rule is recorded as data-saving procedure information by the data management means, whereas, when the data is extracted, the dummy data that has been added when the data is saved is removed at a predetermined step where the saved divided data are integrated or decrypted according to the data-saving procedure information, complete reconstitution cannot be achieved because of the intervention of the dummy data even if the saved data are subjected to a furtive glance and are decrypted, and therefore security is further improved when the saved data are stolen.

Further, if the divided data are saved in a plurality of data servers while being provided with redundancy, the original data can be reconstituted only from the data of the other normal servers even if one of the data servers goes down. In consideration of the fact that the data server itself goes down, this distributed data archive system is safer.

Preferably, an IC card with high security is used as the portable recording medium mentioned above. This makes it more difficult to read or copy the data-depository information or the data-saving procedure information recorded thereon, and therefore only the owner of the IC card can access the saved data.

The distributed data archive device mentioned above can be realized by building a dedicated program into a general purpose computer, and such a dedicated program can be distributed by recording it onto a computer-readable recording medium. If the dedicated program is built into an arbitrary general purpose computer that can be connected to data servers through the network, this general purpose computer can be used as the distributed data archive device according to the present invention, and it is possible to access the saved data substantially from an arbitrary location as long as the portable recording medium is carried with the user.

BEST MODE FOR CARRYING OUT THE INVENTION

§1. Basic Embodiment

Figure 1:
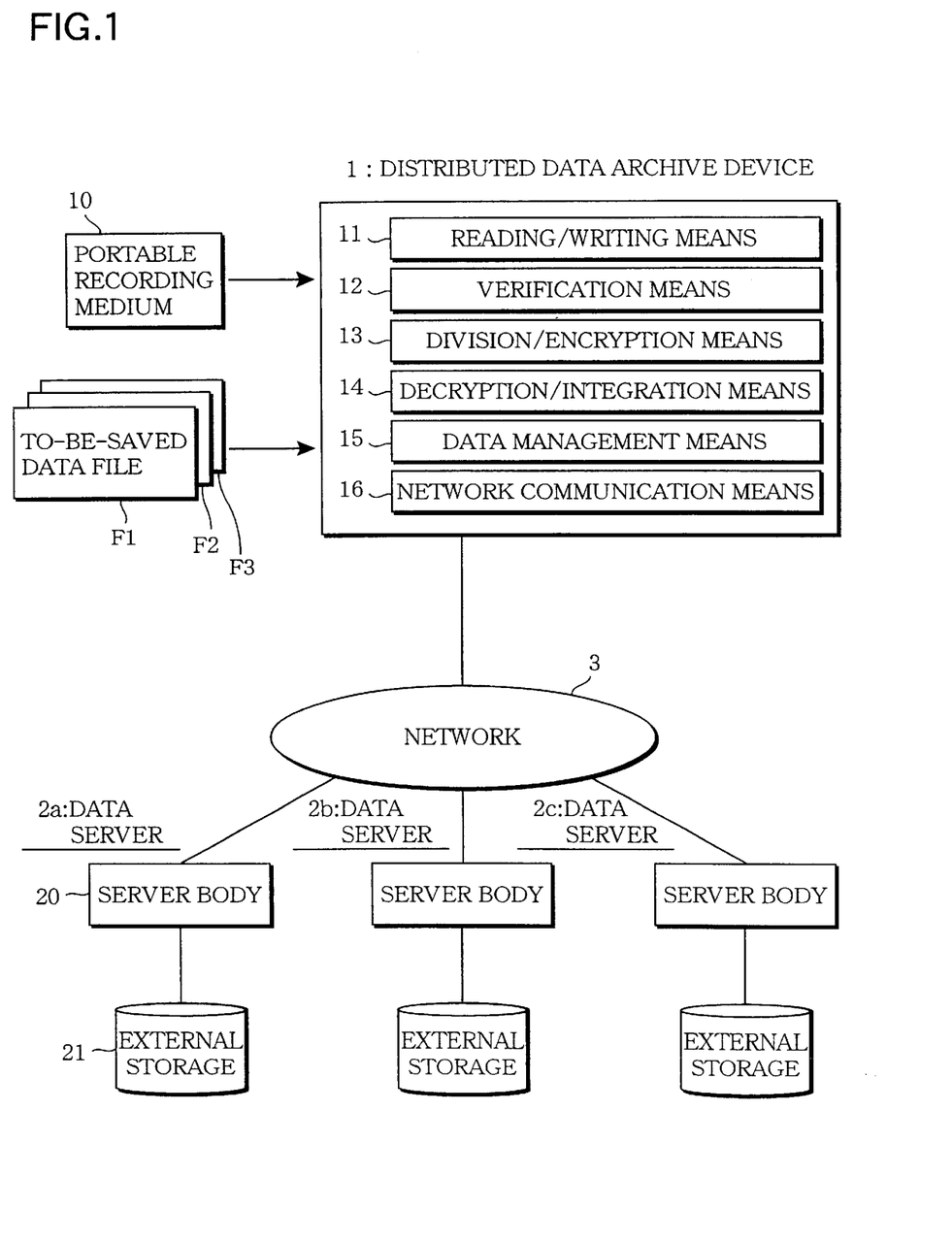
FIG. 1 is a schematic general drawing of a distributed data archive system that is one embodiment of the present invention.

First, a basic embodiment of the present invention will be described. FIG. 1 is a schematic general drawing of a distributed data archive system according to the present invention. A distributed data archive device 1 is one that serves as a main element of this archive system, and has a function to retain desired data in a plurality of data servers 2 (in FIGS. 1, 2a, 2b, 2c) through a network 3. A portable recording medium 10 can be inserted into the distributed data archive device 1, and, when the above-mentioned function is performed, the distributed data archive device 1 and the portable recording medium 10 work interrelatedly with each other. As shown in FIG. 1, the distributed data archive device 1 is made up of a reading/writing means 11, a verification means 12, a division/encryption means 13, a decryption/integration means 14, a data management means 15, and a network communication means 16. Individual functions of these means are described later. In order for a user to save data utilizing the data archive system shown in FIG. 1, all that is necessary is to give the to-be-saved data to the distributed data archive device 1 in the form of each file. FIG. 1 shows an example in which three files F1, F2, and F3 are given to the distributed data archive device 1 as to-be-saved data files. Concretely, the distributed data archive device 1 can be realized by building a dedicated software program, by which a function described later is fulfilled, into a general purpose computer provided with a drive unit used for a portable recording medium 10. On the other hand, the data servers 2 are each made up of a main server 20 and an external storage 21. The to-be-saved data is kept in the plurality of data servers 2a, 2b, and 2c through the network 3 according to a predetermined data-saving procedure in the form of each individual file.

Figure 2:
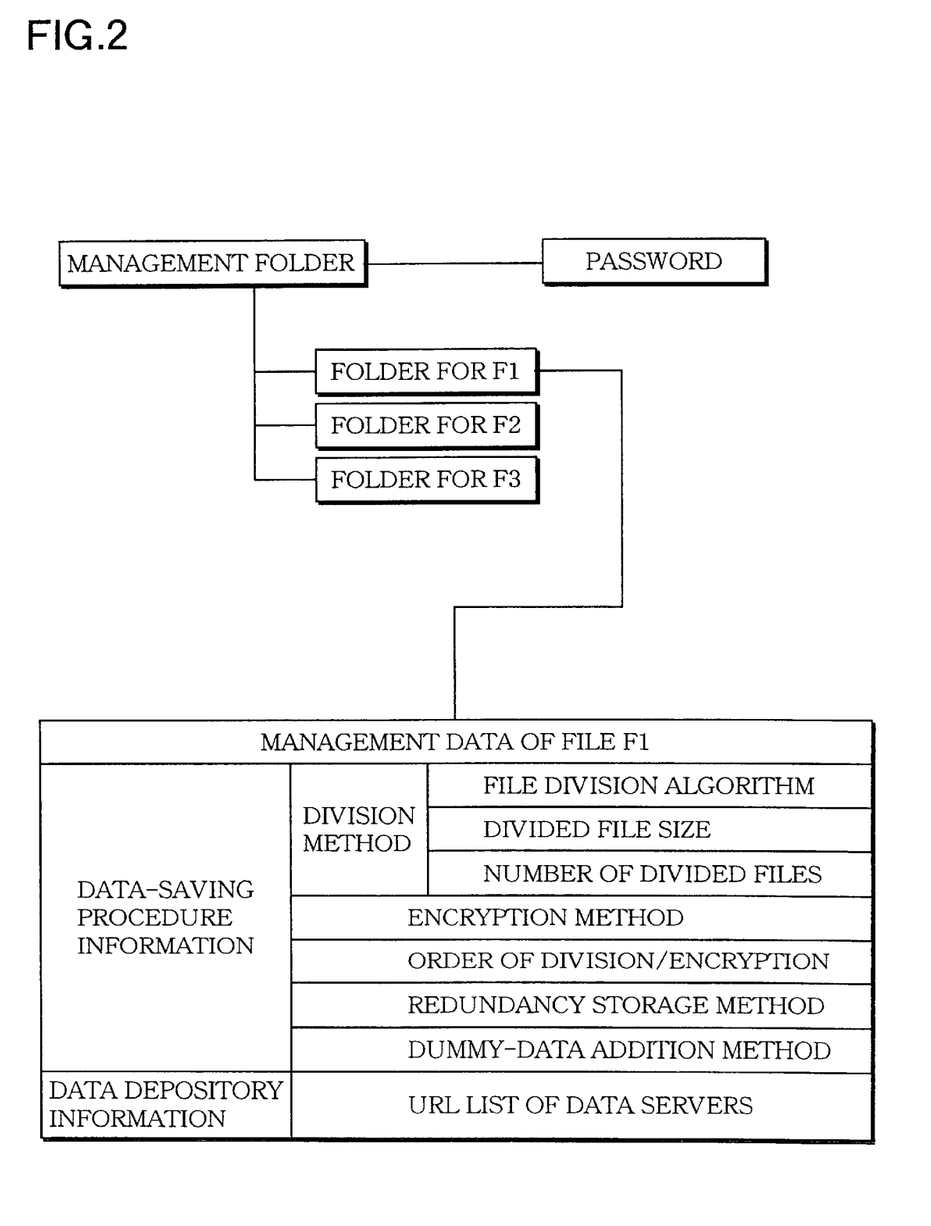
FIG. 2 shows an example of management data recorded on a portable recording medium 10.

Management data that indicates a data depository and a data-saving procedure is stored in the portable recording medium 10 for each file (F1, F2, and F3, in the example of the figure) that has been saved in the data servers 2a, 2b, and 2c. FIG. 2 shows an example of management data recorded on the portable recording medium 10. A management folder that is accessible by inputting a predetermined password is formed in the one portable recording medium 10, and a folder for storing management data for each file is further formed in the management folder. For example, in the example of FIG. 2, three folders represented as Folder for F1, Folder for F2, and Folder for F3 are formed in the management folder, and management data used for file F1, management data for file F2, and management data for file F3 are stored in the folders, respectively. FIG. 2 shows the contents of the management data for file F1 among them. Each management data is made up of data depository information that shows the depository of data that constitutes each file and data-saving procedure information that shows the saving procedure of the data. In the present invention, one data file to be saved is divided into a plurality of parts, which are distributed and saved in a plurality of data servers. The data depository information is one that shows the locations of a plurality of data servers that are each a depository destination of a data file to be saved. More specifically, the data depository information is constructed by a list of addresses (i.e., Uniform Resource Locator, which is hereinafter referred to as URL) of a plurality of data servers that are depository destinations.

On the other hand, in the example of the figure, the data-saving procedure information is made up of information (e.g., identification characters, numerals, conditional equations, etc.) that show the items of "division method", "encryption method", "order of division/encryption", "redundancy storage method", and "dummy-data addition method". Herein, the item "division method" is further classified into the detailed items of "file division algorithm", "divided file size", and "number of divided files". For example, when the to-be-saved data file F1 is saved, this data file F1 is divided into a plurality of files. At this time, information about how to divide is stored in the "division method" item as management data. In more detail, information about what type of "file division algorithm" is used for division, information about how each "divided file size" is set, and information about what the "number of divided files" has gone up to are stored in the respective detailed items.

When the to-be-saved data file F1 is encrypted, information that shows the method according to which the file has been encrypted is stored in the "encryption method" item as management data. Information about whether encrypted data has undergone division processing after the original data file F1 that has not yet been subjected to the division processing has been encrypted or each divided file has undergone encryption after the division processing has been completed is stored in the "division/encryption order" item as management data.

Further, when each individual divided file is saved and stored onto each data server while being provided with redundancy, information that shows a redundancy storage method that has been employed is stored in the "redundancy storage method" item as management data. Two methods, i.e., a mirroring method and a parity file formation method are each known as a general redundancy storage method. If the mirroring method is employed, each divided file is duplicately saved onto two different data servers, i.e., primary and secondary data servers. In the case where a divided file disappears, danger can be avoided as long as the other divided file remains. On the other hand, if the parity file formation method is employed, a parity file is formed such that, for example, an exclusive-OR for each bit is taken with respect to a pair of divided files identical in data length with each other, and this parity file and the pair of divided files are each stored in a predetermined data server (generally called a RAID3 method). In the case where one of the pair of divided files disappears, the divided file that has disappeared can be reconstituted as long as an exclusive-OR for each bit is taken with respect to the other divided file of the pair and the parity file.

If dummy data independent of the data stored on the file F1 is added in a process of dividing the to-be-saved data file F1, information that shows how to add dummy data will be stored in the "dummy-data addition method" item as management data. For example, random arbitrary data can be generated to use it as dummy data, or some data prepared beforehand can be used as dummy data. The addition of such dummy data makes it possible to disturb the contents to be read even if the divided file has been read by an illegal means, and therefore security can be improved. Of course, the dummy data is allowed to be added to any part of the original data. For example, several bytes of dummy data may be added to a specific place, such as a head or a foot, of each divided file obtained by dividing the to-be-saved data file F1, or, alternatively, dummy data may be added to some places of the divided file according to such a specific rule as to insert one byte of dummy data into the third byte from the head. Information stored in the "dummy-data addition method" item as management data is one that shows how the dummy data has been added, to which reference is made in order to carry out the removing process of the dummy data when the original data is extracted later.

In the data files F2 and F3, not shown in FIG. 2, management data is likewise formed and stored in a management folder of the portable recording medium 10. Thus, when the three data files F1, F2, and F3 are saved through the data archive system of the present invention, each of the data files is divided into a plurality of divided files, and each of the divided files is saved onto any one of the data servers. For example, if the data file F1 is divided into four divided files F11 to F14, these files F11 to F14 are distributed and saved onto any one of the three data servers 2a to 2c of FIG. 1. In this case, information about how the original data file F1 has been divided, about what bytes the size of each divided file is, and about how many divided files have been formed in total is stored onto the management folder of FIG. 2 as management data (data-saving procedure information) of the file F1. If the encryption method, the redundancy storage method, the dummy data addition method, etc., are employed at this time, information about these methods is also stored as management data. Information (i.e., URL list of the data servers) that shows the data server on which each of the four divided files F11 to F14 is saved is stored onto the management folder of FIG. 2 as management data (data depository information) of the file F1.

A unique file name is designed to be given to each of the divided files formed on the basis of the to-be-saved data file in accordance with a predetermined rule, and the correlation of the divided files with the original data file is designed to be clarified. For example, in the above-mentioned situation, if the file name of the to-be-saved data file is "F1", the names "F11" to "F14" are given to the divided files formed from this data file "F1" according to the rule that the numerals 1 to 4 are each added to the end of "F1". Herein, for example, the folder name of "Folder for F1" shown in FIG. 2 is designated as "F1" identical to that of the data file F1, and a list in which the URL of a data server that is a depository destination corresponds to each of the divided file names "F11" to "F14" (concretely, a list like F11→URL(2a), F12→URL(2b), . . . ) is recorded in data depository information concerning the management data of the file "F1" recorded in the folder "F1". If so, the corresponding relationship between the filename "F1" of the to-be-saved data file and the file names "F11" to "F14" of the divided files can be clearly described by the file structure of FIG. 2. Normally, a URL formulated like http://www.(server identifying code)/(file identifying code) is used in the Internet. Therefore, practically, convenience will be provided if a URL list like http://www.(data server 2a)/(divided file F11), http://www.(data server 2b)/(divided file F12), . . . , in stead of a list that shows a corresponding relationship like F11→URL(2a), F12→URL(2b) . . . , is prepared as data depository information.

Therefore, the data file F1 saved according to the above procedure can be extracted at any time and from any place if the management data (i.e., data-saving procedure information and data depository information) of the file F1 stored in the management folder is prepared so as to permit access to the data archive system. In other words, since a data server where a necessary divided file is saved can be recognized by reference to data depository information (i.e., URL list of the data server) in the management data of the file F1, all divided files necessary for reconstitution can be read. Moreover, reference to data-saving procedure information in the management data of the file F1 makes it possible to recognize a reconstituting procedure about how the divided files that have been read should be decrypted, about which part of the divided files should be deleted as dummy data, and about how the divided files should undergo file integration, in order to obtain the original data file F1. Therefore, the original data file F1 can be reconstituted following this reconstituting procedure. That is, extracting processing of the saved data can be performed.

The means 11 to 16 of the distributed data archive device 1 shown in FIG. 1 each have a function to save the data file and a function to extract the saved data as mentioned above. That is, the reading/writing means 11 is a means for accessing a management folder in the portable recording medium 10, and serves to read and write the management data of each individual file. The verification means 12 serves to check the authenticity of the portable recording medium 10 itself, and serves to authenticate a user by confirming the password input necessary to access the management folder. The division/encryption means 13 serves to divide a specific data file to be saved according to a predetermined division method under a predetermined rule when instructions for saving are given, and serves to carry out the processing for encryption, dummy data addition, and redundancy storage, if necessary, so as to determine a data server where each of the divided files is saved.

On the other hand, the decryption/integration means 14 serves to, when instructions are given to extract a saved specific data file, perform the processing for integration of divided files, decryption, and dummy data deletion on the basis of management data that shows a processing procedure of the specific data file when saved. When instructions are given to perform saving, the data management means 15 serves to form management data (i.e., data-saving procedure information and data depository information) that shows the processing procedure executed by the division/encryption means 13 and the depository destination of each divided file, and serves to write the management data onto the management folder of the portable recording medium 10 through the reading/writing means 11. On the other hand, when instructions are given to perform extraction, the data management means 15 reads necessary management data from the management folder of the portable recording medium 10 through the reading/writing means 11, and transmits it to the decryption/integration means 14 and the network communication means 16. The data management means 15 further serves to access the management folder of the portable recording medium 10 and exhibit its contents to users through the reading/writing means 11. The network communication means 16 shown at the end in the figure serves to transfer each of the divided files to a predetermined data server through the network 3 and store it by the use of a file transfer protocol (hereinafter referred to as FTP) that is a standard technique of the Internet, or, conversely, serves to read a divided file from the predetermined data server.

If the distributed data archive device 1 made up of these means 11 to 16 is disposed everywhere on the network 3, a user carrying the portable recording medium 10 can save an arbitrary data file anytime and anywhere as long as it is a location where the data archive device 1 is disposed, and can extract the arbitrary saved data file. If the Internet is used as the network 3, the user can save data and extract the saved data from anywhere in the world as long as it is a location where the data archive device 1 is disposed. Thus, it is a primary advantage of the data archive system according to the present invention that a data file can be saved and extracted anywhere and anytime as long as the portable recording medium 10 is carried. This primary advantage will lead to the improvement of security of saved data against natural disasters, accidents, etc. For example, insurance companies or financial institutions are required to take countermeasures for safely saving valuable business data. The employment of the system according to the present invention makes it possible to distribute the to-be-saved data to every part of the world and save it, and, additionally, realize a data archive system with high durability against local disasters or accidents.

It is a second advantage of the data archive system of the present invention that satisfactory security can be secured without special countermeasures for the data server side. If the Internet is used as the network 3 in the system of FIG. 1, the convenience of users becomes better. However the security of the data servers 2a to 2c cannot necessarily be regarded as prudential, considering a possibility that data saved on each data server will be read because of illegal access. However, according to the data archive system of the present invention, a to-be-saved data file is divided into a plurality of divided files when saved, and the divided files are distributed and saved onto a plurality of data servers. Therefore, each individual divided file cannot constitute original information by itself. For this reason, problems about security do not occur even if the individual divided file saved on each data server is read by an illegal means. Normally, when business data is backed up, to take a satisfactory security countermeasure is needed for a data server that is a backup destination. This causes a rise in cost for backing up. However, according to the system of the present invention, it is possible to reduce the cost of the backup because there is no need to take a special security countermeasure for the data server side.

It is true that there is a fear that some significant information will leak because of illegal access if an individual divided file has some data length even if it is fragmentary. Therefore, practically, it is preferable to prevent the contents of the original file from being perceived in the case where only one divided file has been read. This perception of the contents can be prevented as a result of devising the division method in such a way that, for example, one divided file is constructed with data in which one byte is taken at every third byte if three divided files are formed. Further, to improve security, it is preferable to perform encryption based on predetermined algorithm or add dummy data before division or after division as described in the above embodiment.

The management data of each file stored on the portable recording medium 10 is information needed to extract each file, and the saved data file will be extracted by illegal access if this management data is stolen. Therefore, practically, it is preferable to use a medium whose recorded contents are not easily illegally accessed as the portable recording medium 10. More specifically, if an IC card (hereinafter referred to as archive card) provided with a built-in CPU, for example, is used as the portable recording medium 10, satisfactory security can be secured. In order to further improve the security, it is preferable to make a setting so that a password is required to access the management folder of the portable recording medium 10 as described in the above embodiment.

§2. Concrete Operational Procedure

Figure 3:
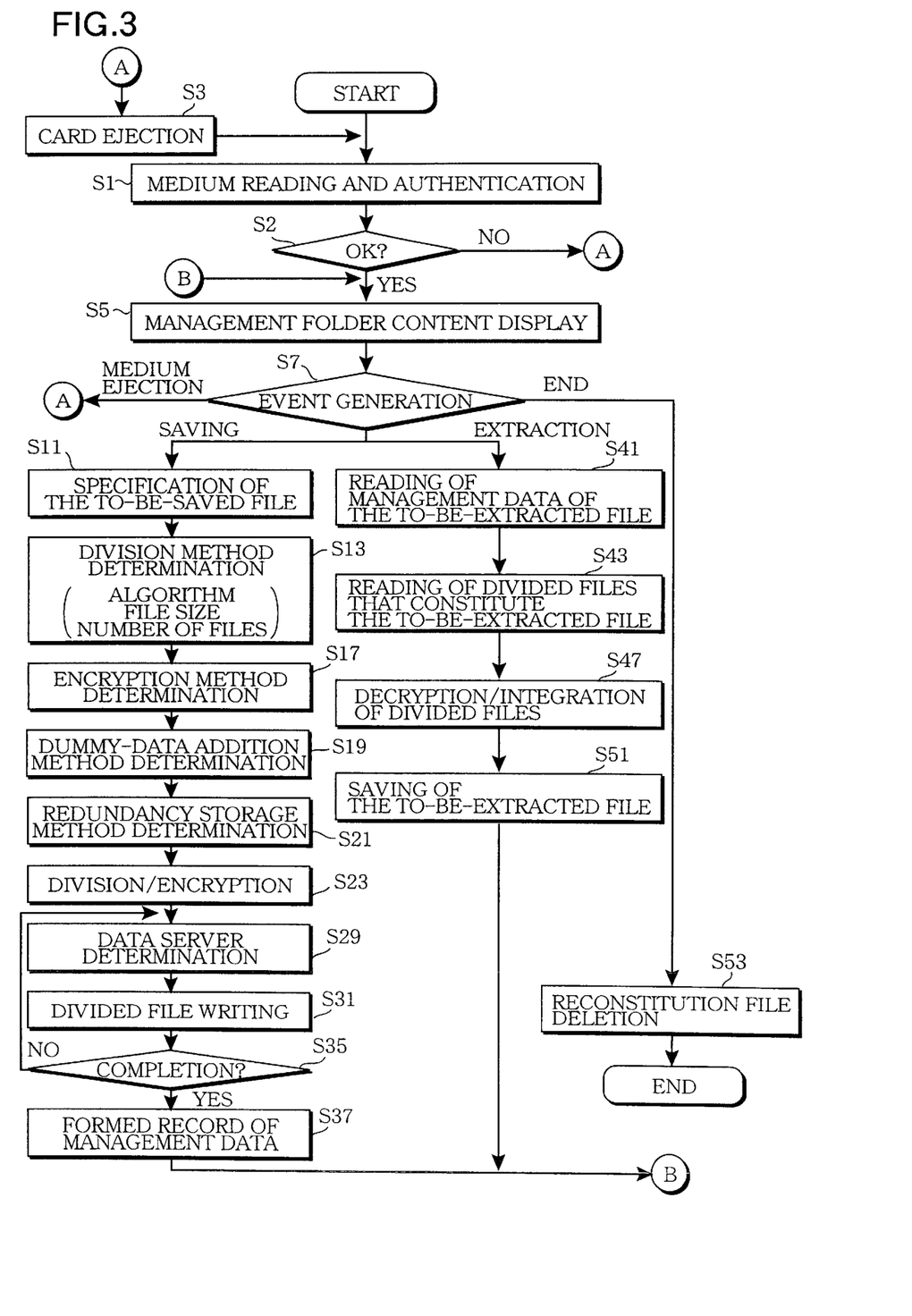
FIG. 3 is a flowchart showing the operational flow of a distributed data archive device 1.

Next, a description will be given of an example of the operational procedure of the distributed data archive device according to the present invention. FIG. 3 is a flowchart showing the operational flow of the distributed data archive device 1. The operation of the distributed data archive device 1 will be hereinafter described with reference to this flowchart. In the following description, the portable recording medium 10 is supposed to use an IC card (archive card) with satisfactory security.

First, a user starts the distributed data archive device 1. As mentioned above, in practice, the distributed data archive device 1 is realized by building a piece of dedicated data archive software into a general-purpose computer provided with a drive unit for an IC card. Therefore, the start processing of the distributed data archive device 1 is the operation to start the dedicated data archive software on the general-purpose computer. When the distributed data archive device 1 is started, a message that urges the insertion of the archive card 10 is displayed on a display screen, and a standby state continues until the archive card 10 is inserted. When the user inserts the archive card 10, the reading/writing means 11 starts access so as to exchange data necessary for authentication. The authenticity of the distributed data archive device 1(i.e., authenticity of the reading/writing means 11) is checked on the side of the archive card 10 while the authenticity of the archive card 10 is being checked by the verification means 12. This is the procedure of step S1 in the flowchart of FIG. 3. Since this authenticity checking technique is well known to a person skilled in the art, a detailed description thereof is omitted.

Thereafter, at step S2, if a negative authentication result is obtained, i.e., if it is judged that the inserted archive card 10 cannot be admitted as an authentic archive card, or, oppositely, if it is judged from the side of the archive card 10 that the reading/writing means 11 is illegal, the stage proceeds to step S3, and the inserted archive card 10 is ejected. The stage again returns to step S1, and a standby state continues until a new archive card 10 is inserted. On the other hand, at step S2, if an affirmative authentication result is obtained, the stage proceeds to step S5, and a user is required to input a password. Under the condition that authentication about the user in question is carried out, the contents of the management folder in the archive card 10 are displayed on the display screen. In more detail, after it is confirmed that the password input by the user coincides with the password that has been set about the management folder shown in FIG. 2, the contents in the management folder are read, and the file name (three data files F1, F2, and F3 in the example of FIG. 2) that can be extracted by using the archive card 10 is displayed. An operation menu to accept the operational input from the user is displayed at the same time, and a state of waiting for the interactive operational input (i.e., occurrence of an event) from the user is reached at step S7.

The user can select four kinds of operational inputs from the displayed operation menu in this embodiment, and branching is carried out from step S7 to each step in response to the operational input. In detail, the user can carry out four kinds of operational inputs, i.e., saving processing by which to-be-saved data is newly saved, extraction processing by which data that has already been saved is extracted, medium ejection processing by which an inserted archive card 10 is ejected, and end processing by which the operation of the distributed data archive device 1 is ended (concretely, processing by which dedicated data archive software that is presently being executed is ended). When any one of the four is given, it is recognized at step S7 that an event has occurred, and it jumps to a predetermined branch destination.

Herein, let it be supposed that the user has first selected the saving processing. In this case, first, processing for specifying a to-be-saved file is carried out at step S11. That is, since a window used to specify the to-be-saved file is displayed on the display screen, the user specifies the to-be-saved file from the window. As mentioned above, the distributed data archive device 1 is realized by using a general-purpose computer in this embodiment, and therefore the to-be-saved file can be prepared in such a manner as to be recorded on a magnetic disk, an optical disk, or a photo-magnetic disk accessible by this computer. Of course, the to-be-saved file in the distributed data archive device 1 may be read from the outside through the network 3. Herein, let it be supposed that the data file F1 stored on a hard disk drive of the computer that constitutes the distributed data archive device 1 is specified as the to-be-saved file, for example (in this case, the "management data of file F1" shown in FIG. 2 has not yet been formed).

Thereafter, the "file division method" is determined at step S13. In more detail, conditions are established about how the to-be-saved file F1 is divided (i.e., algorithm), about how much file length the to-be-saved file F1 is divided to have (i.e., file size), and how many files the to-be-saved file F1 is divided into (i.e., number of files). These conditions can be specified by the user. However, practically, it is preferable that the conditions be automatically determined on the basis of a given program prepared in the distributed data archive device 1. Preferably, the conditions depend on each to-be-saved file, in order to improve security. If general division algorithm is employed, the "divided file size" and the "number of divided files" become correlative parameters, and therefore the determination of one of the two inevitably leads to the determination of the other one. For example, if the file length of the to-be-saved file F1 is 100 MB, the determination that the "divided file size" is 20 MB inevitably leads to the determination that the "number of divided files" is 5. Likewise, the determination that the "number of divided files" is 10 inevitably leads to the determination that the "divided file size" is 10 MB.

In the above example, the division algorithm is set according to which equi-division is carried out so that divided files become equal in size to each other, but the file division algorithm is not limited to the equi-division. For example, it is possible to set an arbitrary division algorithm according to which the length of "a divided file located at an even number is set to be twice the file length of a divided file located at an odd number." Further, when a file is divided, an algorithm is not necessarily needed according to which a sequential part of the original file is used as one divided file. For example, when one to-be-saved file is divided into two divided files, not only an algorithm according to which the to-be-saved file is divided into a first divided file that is the first half part of the to-be-saved file and a second divided file that is the latter half part thereof but also an algorithm according to which the to-be-saved file is divided into a first divided file that is constructed by a byte located at an odd number and a second divided file that is constructed by a byte located at an even number is effective. Practically, it is preferable to employ the latter division algorithm in order to secure security. Usually, divided files constructed only by the byte of the odd number or divided files constructed only by the byte of the even number do not completely make sense in themselves, and therefore valuable information can be prevented from leaking even if it is illegally accessed.

It is, of course, possible to employ this division algorithm when the original file is divided into three files or more. In general, if a to-be-saved file is divided into n files, allocation may be carried out such that the first byte is allocated to the first divided file, the second byte is allocated to the second divided file, . . . , the n-th ("-th" represents the suffix of an ordinal number) byte is allocated to the n-th divided file, the (n+1)-th byte is allocated to the first divided file, and the (n+2)-th byte is allocated to the second divided file, in order from a head that constitutes the to-be-saved file. Sequential allocation by arbitrary bytes can be, of course, carried out, instead of the allocation by one byte. In practice, an infinity of algorithms exists when the file is divided, and any one of them can be adopted.

Thereafter, at step S17, the encryption method is determined, and, at the subsequent step S19, the dummy-data addition method is determined, and, at step S21, the redundancy storage method is determined. Practically, it is preferable to automatically determine these methods in accordance with a predetermined algorithm prepared in the distributed data archive device 1 though the user can specify these methods. Further, it is preferable to cause the encryption method or the dummy-data addition method to vary depending on each individual to-be-saved file in order to improve security, and it is preferable to further cause such method to vary depending on each individual divided file.

The determination made by step S17 is not limited to the algorithm according to which encryption is carried out or the data of a cryptographic key used in an encrypting process. This step is allowed to make a determination of the division/encryption order, i.e., a determination of whether the encryption of each divided file is carried out or not, a determination of whether the encryption of each divided file is carried out after the division is completed or not, or a determination of whether the original file is divided into a plurality of files after the file undergoes encryption or not.

At step S19, the method of adding dummy data independent of to-be-saved data is determined according to a given rule at any stage when the to-be-saved data is divided, or when the data is encrypted after the data is divided, or when the data is divided after the data is encrypted. If the addition processing of such dummy data is carried out as mentioned above when saved, the intervention of the dummy data makes it impossible to completely reconstitute the original data even if the saved data is subjected to a furtive glance or is decrypted, and therefore security is further improved.

On the other hand, a determination made by step S21 should be one of whether the mirroring method is adopted as the redundancy storage method or whether the parity file formation method is adopted, as described above.

After what is needed to perform the data saving procedure is determined, the division/encryption means 13 is called at step S23, and, according to the methods determined at each step, the to-be-saved data file F1 is subjected to the division processing, the encryption processing, and the dummy data addition processing so as to create a plurality of divided files. If the parity file formation method is selected as the redundancy storage method, a necessary parity file is also formed at this stage. Thereafter, a data server which is a depository destination of each individual divided file (in this description, a parity file is regarded as one of the divided files) is determined, and this is written. In more detail, a data server which is a depository destination of one divided file is first determined at step S29, and, at step S31, this divided file is transferred to the data server of the depository destination by the operation of the network communication means 16, and is written onto the data server. This processing is repeatedly carried out until the application to all the divided files is completed through step S35. If the redundancy storage is carried out under the mirroring method at this time, each individual divided file is transferred and stored to two different data servers, i.e., to a primarily data server and to a secondary data server. If the redundancy storage is carried out under the parity file formation method, the parity file is transferred to a predetermined data server together with each divided file, and they are stored thereon.

The file transfer processing through the network communication means 16 is carried out in accordance with the FTP as mentioned above. In more detail, for example, a configuration file on which the URL list of data servers that are depository destinations is recorded is prepared, and one of the data servers of the URL list of this configuration file is suitably selected, and one divided file is transferred thereto. If this has been satisfactorily transferred, the next divided file can be transferred to the next data server of the URL list. If the transferring has failed for some reason, the destination is changed to the next data server of the URL list, and the divided file is transferred again.

Finally, management data about the to-be-saved file F1 is formed by the function of the data management means 15 at step S37, and is recorded onto the archive card 10. In detail, the "management data of file F1" including the data-saving procedure information that is made up of the items shown in FIG. 2 and the data depository information that is made up of a URL list of data servers that are the depository destinations of divided files is recorded onto the folder for the file F1. The saving processing of the file F1 that has been specified as a to-be-saved file is completed through the above steps, and the stage again returns to step S5, and a wait for the next event continues.

Next, a case will be assumed in which a user has specified a given file and has selected the extraction processing as an event occurring at step S7. In this case, the management data of a to-be-extracted file is first read from the archive card 10 by the function of the data management means 15 at step S41. For example, the user specifies the file F1 that has already been saved, and the "management data of file F1" shown in FIG. 2 is read from the archive card 10 if the extraction processing has been selected. By the reference to the data depository information included in the management data, it is possible to recognize the URL of the data server on which individual divided files that make up the to-be-extracted file have been saved, and, by the reference to the data-saving procedure information, it is possible to recognize the manner in which the division processing, the encryption processing, the redundancy storage processing, and the dummy data addition processing have been carried out when saved.

Accordingly, at step S43, the reading processing of the individual divided files that make up the to-be-extracted file F1 is performed, so that the individual divided files (and parity files if necessary) stored on the predetermined data servers are read into the distributed data archive device 1 by the function of the network communication means 16 on the basis of the data depository information. Further, at step S47, the decryption/integration processing is applied to the read individual divided files by the function of the decryption/integration means 14 on the basis of data-saving procedure information, and the original file F1 is reconstituted. If the redundancy storage processing has been performed when saved, the file can be, of course, reconstituted through a predetermined reconstitution procedure even if a given data server is out of order. If dummy data has been added when the original data is saved, the dummy data is removed when the processing of step S47 is performed.

Finally, the to-be-extracted file F1 that has been reconstituted in this way is saved onto a predetermined record location (i.e., specified location that is not managed by the software that functions as the distributed data archive device 1) that has been specified by the user. As a result, the saved data is again fed back to the user in reconstituted form. Information necessary for the series of data reconstitution operations mentioned above is recorded on the archive card 10 in the form of management data. Therefore, the user has no need to pay attention to even the fact that the to-be-saved file is saved in the form of a plurality of divided files because the distributed data archive device 1 automatically performs the data reconstitution operations on the basis of the management data.

If the user selects the "end" from the menu as an event of step S7, the stage proceeds to step S53, and, if files that have been reconstituted up to the present remain in the distributed data archive device 1 (i.e., location that is managed by the software that functions as the distributed data archive device 1), they are deleted, and the operation as the distributed data archive device 1 is ended (i.e., the execution of the software that functions as the distributed data archive device 1 is ended.). If the user gives instructions to eject the archive card 10 from the reading/writing means 11 as an event of step S7, the card is ejected at step S3, and the stage returns to step S1, and a wait continues until the next card is inserted.

As described above, according to the present invention, valuable digital data is divided, and the resulting data are saved onto a plurality of data servers. Thus even if the saved data are stolen from one server, security is maintained because the stolen data cannot be reconstituted into the original data. Since an IC card with very great security against illegal data falsification can be used as the archive card 10 needed when data is saved and when the data is extracted, there is no fear that saved data will be stolen, as long as the IC card is not stolen. Further, since the to-be-saved data can be encrypted and be saved if necessary, a big disadvantage does not occur even if a furtive glance is cast at the data of the data server when the data is extracted therefrom on the Internet. Moreover, since all that is necessary for the data servers saving data is to be connected by means of the FTP which is a standard protocol of the Internet, no special device is needed, and the depository destination can be selected considerably freely. It is possible to very conveniently access the saved data from an arbitrary distributed data archive device connected to the network if the archive card 10 is carried. Of course, a protocol by which files are transferred between data servers through the network is not limited to the FTP, and various protocols other than this can be used.

§3. Various Modifications and Applied Examples

Next, modifications and applied examples of the present invention will be described. In the embodiment shown in FIG. 1, the distributed data archive device 1 and the data server 2 (2a, 2b, 2c) were described as devices that have functions completely different from each other, but both the devices are identical with each other in that they are each a "computer in which predetermined software has been built". In practice, a possible use form is that a computer with completely the same hardware configuration is used as the distributed data archive device 1 on the one hand, and, on the other hand, as the data server 2. Computers that are identical from the viewpoint of hardware can be used as the distributed data archive device 1 and as the data server 2, depending on software to be built in. If it is a computer in which the two kinds of software are built at the same time, the computer can be discriminately used, of course, in a manner such as to function as the distributed data archive device 1 in one situation and function as the data server 2 in another situation.

Another example of the use form is as follows. Let it be supposed that computers are placed in three branch offices X, Y, and Z, respectively, and the computers are connected to each other through a network. Software used to function as the distributed data archive device 1 and software used to function as the data server 2 are built in each of the computers, and the data of one of the branch offices is divided into two parts (for example, a first divided file constructed by the byte located at an odd number and a second divided file constructed by the byte located at an even number may be formed), and they are saved and backed up onto the computers of the other two branch offices. In more detail, when the backup of the data of the branch office X is saved onto the computers of the branch offices Y and Z, the computer of the branch office X can be used as the data archive device 1, and the computers of the branch offices Y and Z can be used as the data server 2. Likewise, when the backup of the data of the branch office Y is saved onto to the computers of the branch offices X and Z, the computer of the branch office Y can be used as the data archive device 1, and the computers of the branch offices X and Z can be used as the data server 2. When the backup of the data of the branch office Z is saved onto the computers of the branch offices X and Y, the computer of the branch office Z can be used as the data archive device 1, and the computers of the branch offices X and Y can be used as the data server 2. Accordingly, the names of the constituent elements "data archive device 1" and "data server 2" in the present invention merely signify a role performed when one file is saved or extracted. In practice, the individual computers connected on the network can be caused to function as the "data archive device 1" and as the "data server 2".

Although the management data shown in FIG. 2 is recorded directly onto the archive card 10 (portable recording medium) in the above embodiment, the management data does not necessarily need to be recorded directly there onto. For example, it is possible to employ a way in which the entire management folder shown in FIG. 2 is put in the data server 2a in the block diagram of FIG. 1, and information needed to access this management folder (for example, information showing the URL of the data server 2a, information showing the address where the management data is stored, or information about the password needed to access the management folder) is recorded onto the archive card 10. If this way is employed, when the saving processing of data is carried out, the data management means 15 can write formed management data onto a predetermined address location in the data server 2a and can record the "information needed to access the management data written onto the data server 2a" onto the archive card 10, instead of recording the formed management data directly onto the archive card 10. On the other hand, when the extraction processing of data is carried out, the data management means 15 can first read the "information needed to access the management data written onto the data server 2a" recorded on the archive card 10, and, using this information, can read the management data from the data server 2a, instead of reading the necessary management data directly from the archive card 10. This way can be called, as it were, an indirect record method of recording the management data indirectly onto the archive card 10.

The following two advantages can be obtained by employing the method of recording the management data indirectly onto the archive card 10 in this way. A first advantage is that limitations on the record capacity of the archive card 10 (portable recording medium) can be eased. Like the example of FIG. 2, the management data of each file is made up of data-saving procedure information and data depository information, and has a certain amount of data as a whole. On the other hand, since the archive card 10 is a card-shaped electronic information recording medium, its record capacity is relatively small. Therefore, it is undesirable to record the management data of a lot of files directly onto the archive card 10, because the limited record capacity is wasted. The method of recording the management data indirectly onto the archive card 10 makes it possible to store the management data onto record locations other than the archive card 10 in fact, and all that is needed is to record only information necessary to access this management data onto the archive card 10. Therefore, the limited record capacity can be effectively used.

Another advantage of the method of recording the management data indirectly onto the archive card 10 is that a use form such as to allow a plurality of users to share saved data can be brought about. For example, archive cards 10 which are the same in kind are given to several users belonging to the same group, and information necessary to access the same management data stored on a specific record location is recorded onto the same archive card 10. In this case, every user who has this same kind of archive card 10 can access the same management data, and the same saved data can be extracted on the basis of the same management data.

Figure 4:
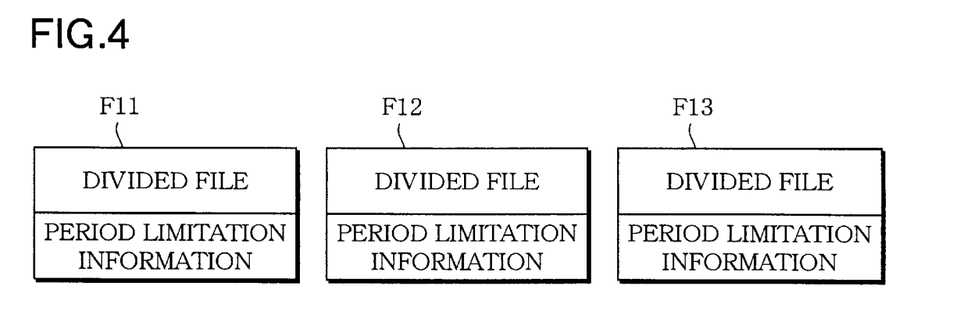
FIG. 4 shows an example in which period limitation information is added to each divided file to be retained in a data server.

Further, according to another aspect of the data archive system of the present invention, period limitation information that shows limitations concerning a period is added to the to-be-saved data, and the data is distributed and saved onto the data server, and limitations based on this period limitation information can be imposed on the data extraction processing. Specifically, like the example of FIG. 4, period limitation information can be added to, for example, each of the divided files F11, F12, and F13 in a predetermined format so as to save it onto each data server. Limitations can be imposed on data extraction such that data extraction is prohibited with respect to a divided file to which the period limitation information stating that "Data extraction is prohibited until the end of June, 2001" has been added, in spite of a user's instructions for data extraction if the instructions are given during an extraction-prohibited period. The checking concerning this period limitation can be done on the side of each data server 2, or can be done on the side of the distributed data archive device 1, or can be done in the archive card 10. With respect to the period limitation information, the limitation showing that "Data extraction is prohibited after July, 2001" can be placed, or the limitation showing that "Data extraction is prohibited during July to September, 2001" can be placed. Active instructions showing that "Delete this data on Jul. 1, 2001" can also be set to automatically delete the data on the data server side at the time limit.

Further, according to another aspect of the data archive system of the present invention, alternative destination information stating a alternative destination different from the original depository destination is added to individual divided files distributed and saved onto each data server, and this alternative destination information is recorded as a part of the management data for the case where some difficulty has occurred in a data server which is the original depository destination. If so, saved data can be caused to take alternative in another data server specified as a alternative destination.

For example, let it be supposed that a to-be-saved file F1 is divided into three divided files F11, F12, and F13, and these divided files are saved onto data servers 2a, 2b, and 2c, respectively. In this case, the original depository destinations of the divided files F11, F12, and F13 become the data servers 2a, 2b, and 2c, respectively. Actually, the divided files F11, F12, and F13 are transferred to the data servers 2a, 2b, and 2c, respectively, by the FTP, and are written. Alternative destination information is added to each of the divided files F11, F12, and F13 when the divided files are transferred. For example, the alternative destination of the divided files F11 and F12 is assumed to be a fourth data server 2d, and the alternative destination of the divided file F13 is assumed to be a fifth data server 2e. If so, the alternative destination information of URL (2d), that of URL (2d), and that of URL(2e) can be added to the divided files F11, F12, and F13, respectively, like the example of FIG. 5. (Herein, the URL(xx) represents information that shows the URL of a data server xx.)

Figure 6:
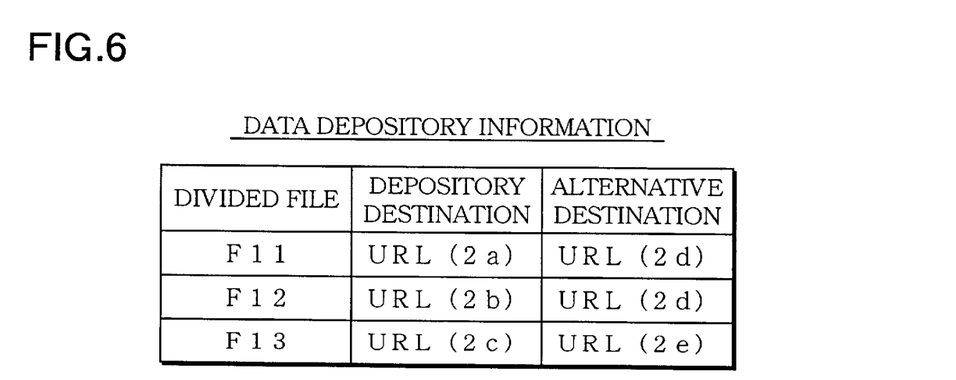
FIG. 6 shows an example of management data with the save destination information shown in FIG. 5.

On the other hand, the alternative destination information added to each divided file is added to the management data of the to-be-saved file F1. In more detail, data depository information (URL list of data servers), such as that of FIG. 6, is formed, and this is recorded onto, for example, the archive card 10 as management data. In the example of FIG. 6, pieces of information that show the original depository destinations of the divided files F11, F12, and F13 are URL(2a), URL (2b), and URL (2c), respectively, and, according to a normal processing procedure, the divided files F11, F12, and F13 are stored onto the data servers 2a, 2b, and 2c, respectively. Herein, information of URL(2d), that of URL(2d), and that of URL(2e) are recorded as the alternative destinations of the divided files F11, F12, and F13, respectively, and it is indicated that the data servers of the alternative destinations are the data servers 2d, 2d, and 2e.

Figure 5:
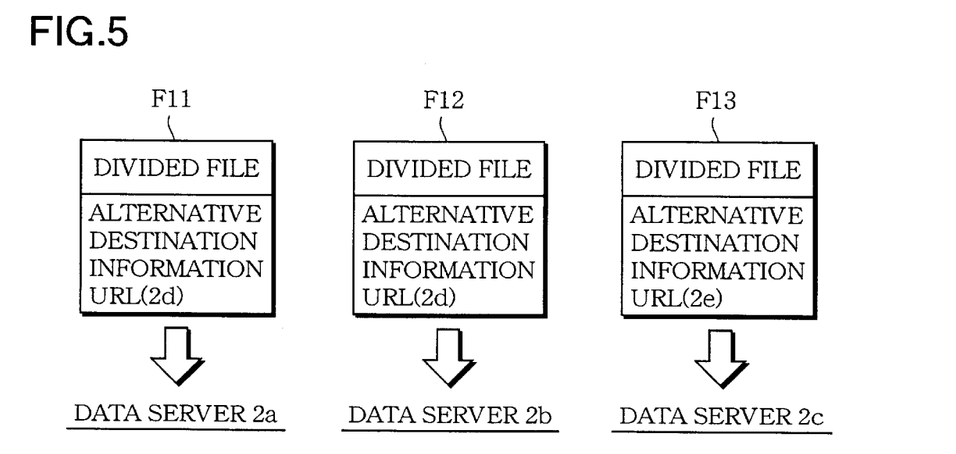
FIG. 5 shows an example in which save-destination information is added to each divided file to be retained in a data server.

Herein, a case will be covered in which some difficulty in usually operating the first data server 2a has occurred. For example, let it be supposed that there has occurred a situation in which the information capacity of the data server 2a becomes almost full, and therefore there is a fear that serious trouble will arise unless a part of the data that is presently stored is moved to the other data servers, or, in order to do the maintenance of a hard disk that constitutes the data server 2a, there is a need to temporarily move the data that is presently stored to the other data servers. In this situation, since the alternative destination information URL (2d) has been added to the divided file F11 saved on the first data server 2a as shown in FIG. 5, the first data server 2a can carry out the processing of transferring the divided file F11 to the fourth data server 2d of a alternative destination according to this alternative destination information.

When the extraction processing of the file F1 is carried out after the divided file is transferred for alternative, the distributed data archive device 1 attempts to read the necessary divided files F11, F12, and F13 from the original data servers mentioned in the depository destination column of the data depository information shown in FIG. 6. Thereupon, the divided file F12 is read from the data server 2b, and the divided file F13 is read from the data server 2c. However, an attempt to read the divided file F11 from the data server 2a ends in failure. When a failure in reading the file from the original depository destination is made in this way, the reading from the alternative destination is attempted. In this case, concerning the divided file F11, an attempt is carried out to read the divided file F11 from the data server 2d mentioned in the alternative destination column of the data depository information shown in FIG. 6. As a result, the divided file F11 can be read without any trouble, though the alternative is not the original depository destination.

When the cause to take alternative is removed, the divided file F11 is allowed to return to the data server 2a that is the original depository destination as before, of course. If alternative destination information is added in this way, the extraction processing of data will be carried out without any trouble even if a situation arises by which data must take alternative to another data server.

The user can specify a data server used as a alternative destination when data files are saved. However, practically, it is preferable to allow the distributed data archive device 1 to perform processing for automatically determining a alternative destination. Alternatively, processing for sending a message from the data server to the distributed data archive device 1 specifying another data server to be used as a alternative destination may be performed.

Industrial Applicability

The data archive device and the data archive system according to the present invention can be widely used to keep arbitrary digital data, and, particularly, they are optimal for the use for backing up valuable digital data while utilizing a wide area network like the Internet.

What is claimed is:

1. A distributed data archive device (1) having a function for distributing and saving to-be-saved data (F1) onto a plurality of data servers (2a, 2b, 2c) accessible through a network (3) and a function for extracting saved data therefrom when necessary, said device (1) comprising:

division means (13) for dividing the to-be-saved data (F1) into a plurality of divided files (F11, F12, and F13) according to a predetermined division method when the data is saved;

integration means (14) for integrating and reconstituting the plurality of divided files into the original to-be-saved data in consideration of the division method when the data is extracted;

network communication means (16) for performing processing for transferring and saving the plurality of divided files onto predetermined data servers, respectively, through the network when the data is saved; and for performing processing for extracting the plurality of divided files saved on the individual data servers through the network when the data is extracted; and data management means (15) for forming management data that comprises data-saving procedure information that shows a procedure followed when the data is saved that includes information showing a division method employed by said division means when the data is saved and data depository information that specifies a data server used as a depository destination of the plurality of divided files that have been transferred by said network communication means, and thereafter performing processing for recording the management data onto a predetermined location, and thereafter reading the management data when the data is extracted, and thereafter performing processing for giving the data-saving procedure information included in the management data to said integration means and for giving the data depository information included in the management data to said network communication means.

2. The distributed data archive device as recited in claim 1, further comprising reading/writing means (11) for reading/writing data from/onto a portable recording medium (10), wherein the data management means (15) performs processing for recording the management data onto the portable recording medium through said reading/writing means.

3. The distributed data archive device as recited in claim 2, further comprising verification means (12) for checking an authenticity of a user, wherein data saving processing or data extraction processing is performed only when a correct authentication result is obtained.

4. The distributed data archive device as recited in claim 2, wherein:

the division means functions as division/encryption means (13) for applying encryption processing to data in a process of performing processing for dividing the to-be-saved data;

the data management means (15) functions to form data-saving procedure information that includes information showing a method of the encryption processing and record said data-saving procedure information as management data; and the integration means functions as decryption/integration means (14) for applying decryption processing to an encrypted part on the basis of information showing the method of the encryption processing included in the data-saving procedure information when divided files are integrated and reconstituted into the original to-be-saved data.

5. The distributed data archive device as recited in claim 1, further comprising reading/writing means (11) for reading/writing data from/onto a portable recording medium (10) in which access information needed to access the management data recorded on a predetermined location is stored, and the data management means (15) reads the access information of the portable recording medium through said reading/writing means and accesses the management data on the basis of this access information.

6. The distributed data archive device as recited in claim 5, further comprising verification means (12) for checking an authenticity of a user, wherein data saving processing or data extraction processing is performed only when a correct authentication result is obtained.

7. The distributed data archive device as recited in claim 5, wherein:

the division means functions as division/encryption means (13) for applying encryption processing to data in a process of performing processing for dividing the to-be-saved data;

the data management means (15) functions to form data-saving procedure information that includes information showing a method of the encryption processing and record said data-saving procedure information as management data; and the integration means functions as decryption/integration means (14) for applying decryption processing to an encrypted part on the basis of information showing the method of the encryption processing included in the data-saving procedure information when divided files are integrated and reconstituted into the original to-be-saved data.

8. The distributed data archive device as recited in claim 1, further comprising verification means (12) for checking an authenticity of a user, wherein data saving processing or data extraction processing is performed only when a correct authentication result is obtained.

9. The distributed data archive device as recited in claim 1, wherein:

the division means functions as division/encryption means (13) for applying encryption processing to data in a process of performing processing for dividing the to-be-saved data;

the data management means (15) functions to form data-saving procedure information that includes information showing a method of the encryption processing and record said data-saving procedure information as management data; and the integration means functions as decryption/integration means (14) for applying decryption processing to an encrypted part on the basis of information showing the method of the encryption processing included in the data-saving procedure information when divided files are integrated and reconstituted into the original to-be-saved data.

10. The distributed data archive device as recited in claim 9, wherein the data management means (15) uses information which showing an execution order about division processing and encryption processing as a part of information showing the method of the encryption processing.

11. The distributed data archive device as recited in claim 1, wherein:
the division means (13) performs processing for adding dummy data independent of the to-be-saved data in a process for dividing the to-be-saved data;
the data management means (15) functions to form data-saving procedure information that includes information about dummy data addition processing and record the data-saving procedure information as management data; and
the integration means (14) performs processing for removing the dummy data that has been added, on the basis of the information about dummy data addition processing included in the data-saving procedure information when divided files are integrated and reconstituted into the original to-be-saved data.

12. The distributed data archive device as recited in claim 1, wherein:
the division means (13) performs redundancy storage processing to add redundancy to the to-be-saved data during a process for dividing the to-be-saved data to form a plurality of divided files;
the data management means (15) functions to form data-saving procedure information that includes information about the redundancy storage processing and record the data-saving procedure information as management data; and
the integration means (14) performs processing for reconstituting the original to-be-saved data in consideration of the information about the redundancy storage processing included in the data-saving procedure information.

13. The distributed data archive device as recited in claim 1, said archive device further functioning:
during data saving procedure, to add period limitation information that shows limitation about a period to the to-be-saved data, and thereafter distribute and save said data onto data servers; and
during data extracting procedure, to perform extraction processing in consideration of limitation based on the period limitation information.

14. The distributed data archive device as recited in claim 1, said archive device further functioning:
during data saving procedure, to add alternative destination information, that shows a alternative destination different from an original depository destination, to individual divided files which are distributed and saved onto data servers, and to record the alternative destination information as a part of the management data: and
during data extracting procedure, to extract a desired divided file from a data server used as the alternative destination shown by the alternative destination information if the desired divided file cannot be extracted from a data server used as the original depository destination.

15. A distributed data archive system comprising: a distributed data archive device (1) as recited in claim 1; a network (3) to which said distributed data archive device is connected; a plurality of data servers (2a, 2b, 2c) for receiving access from said distributed data archive device through said network (3); and a portable recording medium (10) used as a record location of "management data formed in said distributed data archive device" or "information needed to access said management data".

16. The distributed data archive system as recited in claim 15, wherein a terminal device connected to the network is designed to perform both a function as the distributed data archive device (1) and a function as the data servers (2a, 2b, 2c), and can select one of the two functions in accordance with a use.

17. The distributed data archive system as recited in claim 15, wherein an IC card is used as the portable recording medium (10), and an authenticity of the portable recording medium itself is checked when the distributed data archive device (1) accesses the portable recording medium.

18. The distributed data archive system as recited in claim 15, wherein information needed to access a same management data is stored on a plurality of portable recording mediums (10).

19. The distributed data archive system as recited in claim 15, wherein the distributed data archive device (1) can function to add alternative destination information that shows a alternative destination different from an original depository destination to an individual divided file distributed and saved onto an original data server (2a, 2b, 2c) when the data is saved, and can function to perform processing for allowing the divided file being saved to take alternative to another data server used as the alternative destination shown by the alternative destination information if said original data server (2a, 2b, 2c) has met difficulty in continuing saving the divided file.

20. A computer-readable recording medium on which a program to realize the distributed data archive device as recited in claim 1 is recorded.

* * * * *